United States Patent
Cok

(10) Patent No.: US 7,064,748 B2
(45) Date of Patent: Jun. 20, 2006

(54) RESISTIVE TOUCH SCREEN WITH VARIABLE RESISTIVITY LAYER

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 417 days.

(21) Appl. No.: 10/385,878

(22) Filed: Mar. 11, 2003

(65) Prior Publication Data

US 2004/0178006 A1    Sep. 16, 2004

(51) Int. Cl.
*G09G 5/00*    (2006.01)

(52) U.S. Cl. .................... 345/173; 178/18.01

(58) Field of Classification Search ........ 345/173–176; 178/18.01–18.11; 252/500; 428/208, 328, 428/336, 402
See application file for complete search history.

(56) References Cited

U.S. PATENT DOCUMENTS

| | | | |
|---|---|---|---|
| 4,625,075 A | | 11/1986 | Jaeger |
| 4,687,885 A | * | 8/1987 | Talmage et al. ......... 178/18.05 |
| 5,041,701 A | | 8/1991 | Wolfe et al. |
| 5,736,688 A | * | 4/1998 | Barrett et al. ............ 178/18.05 |
| 6,214,520 B1 | * | 4/2001 | Wolk et al. .............. 430/273.1 |
| 6,259,490 B1 | | 7/2001 | Colgan et al. |
| 6,811,878 B1 | * | 11/2004 | Kawamura et al. ......... 428/402 |
| 2002/0094660 A1 | | 7/2002 | Getz et al. |
| 2002/0135569 A1 | | 9/2002 | Chen |
| 2003/0008135 A1 | * | 1/2003 | Kawamura et al. ......... 428/336 |
| 2003/0164477 A1 | * | 9/2003 | Zhou et al. ................. 252/500 |
| 2003/0197688 A1 | * | 10/2003 | Aufderheide et al. ....... 345/173 |

\* cited by examiner

*Primary Examiner*—Amare Mengistu
(74) *Attorney, Agent, or Firm*—Andrew J. Anderson; Thomas H. Close

(57) ABSTRACT

A resistive touch screen includes a transparent substrate defining a touch area; a first layer of conductive material formed on the transparent substrate and extending over the touch area; an electrical connection to the first layer of conductive material; a transparent flexible cover sheet; a second layer of conductive material formed on the transparent flexible cover sheet, the cover sheet being mounted in a spaced apart relationship from the substrate, whereby a touch in the touch area results in an a electrical contact between the first and second layers of conductive material at the point of touch; an electrical connection to the second layer of conductive material; and at least one of the first or second layers of conductive material having a variable conductivity.

35 Claims, 4 Drawing Sheets

RESISTIVE TOUCH SCREEN WITH VARIABLE RESISTIVITY LAYER

FIELD OF THE INVENTION

This invention relates to resistive touch screens and more particularly, to the formation of a resistive layer in the resistive touch screen.

BACKGROUND OF THE INVENTION

Resistive touch screens are widely used in conventional CRTs and in flat-panel display devices in computers and in particular with portable computers. FIGS. 2 and 3 show a portion of a prior art four-wire resistive touch screen 10, which includes a transparent substrate 12, having a first conductive layer 14 defining a touch area. This conductive layer typically comprises indium tin oxide (ITO) or conductive polymers such as polythiophene. A flexible transparent cover sheet 16 includes a second conductive layer 18 that is physically separated from the first conductive layer 14 by spacer dots 20. Conductive patterns 30 having lower resistance than the conductive layer 14 defining an edge area are arranged over the conductive layer 14 at opposite edges of the conductive layer 14 on transparent substrate 12. The conductive patterns 30 are provided by an additional layer of material that is in electrical contact with conductive layer 14. Conductive patterns 30 are also provided in electrical contact with and at opposite edges of the conductive layer 18 on the flexible transparent cover sheet 16 (because of the four conductive patterns 30 this is commonly referred to as a four-wire design). The shape of these conductive patterns 30 can be adjusted to improve the linearity of the response of the touch screen. See for example U.S. Pat. No. 4,625,075 issued Nov. 25, 1986 to Jaeger. These conductive patterns 30 are used to provide electrical connection to the conductive layers 14 and 18.

In an alternative design (commonly called a five-wire design) all four conductive strips 30 are located on the substrate 12 and the second conductive layer 18 is the so-called fifth wire. The five-wire design may also utilize specially chosen patterns for the four conductors 30 on substrate 12 to improve the linearity of the device response.

The flexible transparent cover sheet 16 is deformed, for example by finger pressure, to cause the first and second conductive layers 14 and 18 to come into electrical contact. A voltage is applied across the conductive layers 14 via electrical connections 33 and a resulting signal is measured on the electrical connections 31 connected to layer 18 to determine the location of the touch in one direction. The voltage is then applied across the conductive layer 18 and the signal is measured on the electrical connection 33 to determine the location of the touch in the orthogonal direction. The conductive layers 14 and 18 have a resistance selected to optimize power usage and position sensing accuracy.

In conventional prior-art manufacturing processes, the conductors 30 are made of silver inks screen printed onto the conductive layers 14 and 18. In practice, this process has a number of disadvantages. First, the silver inks are costly and the screen printing process is expensive in that additional manufacturing steps and materials are needed. Second, unless they are carefully prepared and printed, the silver inks do not adhere well to the conductive layers. Moreover, the process of adhering the inks to the conductive layers may require high temperatures, creating problems for other materials in a touch screen or associated display system. Furthermore, the width of the edge area of the touch screen may need to be relatively large to accommodate the patterns used to linearize the response of the touch screen.

There is a need therefore for an improved means to provide conductive patterns for a resistive touch screen and a method of making the same that can reduce the width of the edge area, improve the robustness of the touch screen and reduce the cost of manufacture.

SUMMARY OF THE INVENTION

The need is met by providing a resistive touch screen that includes a transparent substrate defining a touch area; a first layer of conductive material formed on the transparent substrate and extending over the touch area; an electrical connection to the first layer of conductive material; a transparent flexible cover sheet; a second layer of conductive material formed on the transparent flexible cover sheet, the cover sheet being mounted in a spaced apart relationship from the substrate, whereby a touch in the touch area results in an a electrical contact between the first and second layers of conductive material at the point of touch; an electrical connection to the second layer of conductive material; and at least one of the first or second layers of conductive material having a variable conductivity.

ADVANTAGES

The touch screen of the present invention has the advantages that it is simple to manufacture, reduces costs, and provides a larger active area.

DETAILED DESCRIPTION OF THE INVENTION

Figure 1:
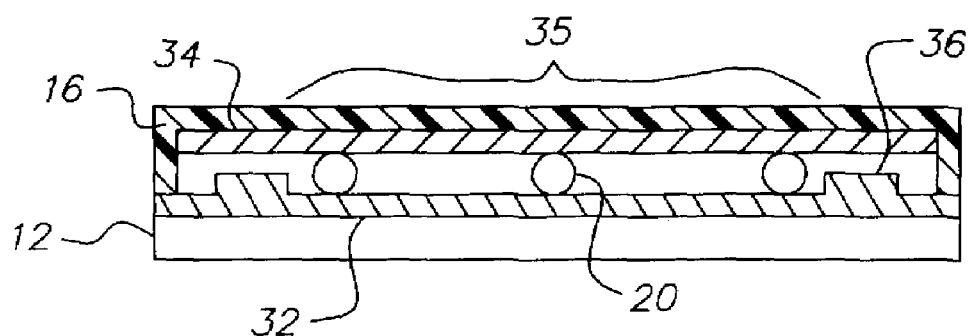
FIG. 1 is a schematic diagram showing a cross sectional view of a four-wire touch screen according to the present invention.

Referring to FIG. 1, the problems of the prior art resistive touch screens are overcome through the use of a variably conducting layer 32 deposited on the substrate 12. A flexible transparent cover sheet 16 having a second conductive layer 34 is separated from the variably conducting layer 32 by conventional means, for example spacer dots 20. The conductive layer 32 deposited on the substrate 12 and/or the conductive layer 34 deposited on the flexible transparent cover sheet 16 are variably conducting.

The variation in conductivity of the variably conducting layers 32 and/or 34 may be continuous or discontinuous. If the conductivity of a layer is continuous, the sheet resistance of the layer varies continuously and gradually from location to location in the layer. If the conductivity of a layer is discontinuous, a specific location in the layer will have a conductivity that is substantially different from a nearby location.

Figure 2:
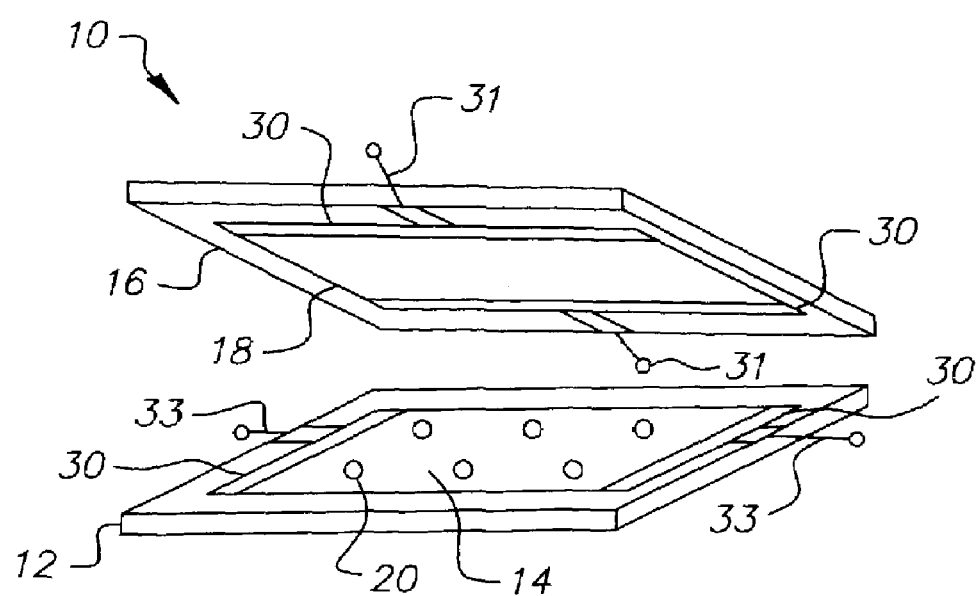
FIG. 2 is a schematic diagram illustrating a prior art four-wire touch screen.
Figure 3:
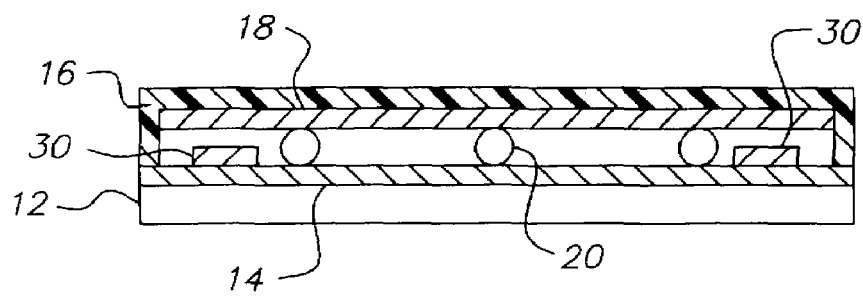
FIG. 3 is a schematic diagram showing a side view of the prior art four-wire touch screen.

In prior art touch screens, the sheet resistance of a conductive layer in the touch area of a resistive touch screen is a constant value typically in the range of 300 to 600 ohms per square. Resistance values outside of this range may be employed for different purposes, for example reduced power consumption or reduced errors. In one embodiment of the present invention, the sheet resistance may vary in the touch area within the range of 300 to 600 ohms or go well outside the range. According to another embodiment of the invention, the edge area, defined by the conductive patterns 30 of FIG. 2, are replaced by more highly conductive portions 36 of the variably conductive layer 32.

Typical material used for transparent conductive coatings include indium tin oxide (ITO), indium zinc oxide (IZO), or conductive polymers such as polythiophene. As these materials are coated on a substrate, their sheet resistance will vary with the thickness of the deposition. By depositing the material with varying thickness, a variably conducting layer may be formed. If the material is deposited with twice the thickness, its sheet resistance may drop by half. Alternatively, the composition of the material may be varied in a single layer to vary the conductivity of the layer. The substrate on which the variable conductivity pattern is formed can be either rigid or flexible.

In accordance with one embodiment of the invention, the at least one variable conductive material layer may define a region of uniform conductivity covering the touch area and an edge area having a higher conductivity than the uniform conductivity, with the electrical connection to the at least one layer being made to the edge area. The edge area may have a variable conductivity effective to linearize electric fields in the touch area of the at least one layer of conductive material, or to compensate for the resistivity of the edge area. The edge area may have a variable conductivity provided by a pattern of variable width or thickness. In a further embodiment, the at least one variable conductive material layer may have a variable conductivity in the touch area effective to linearize electric fields in the layer of conductive material in the touch area.

In particular, discontinuous conductive edge patterns 30 such as those formed to improve the linearity of the touch screen response (for example as shown in U.S. Pat. No. 5,736,688 issued Apr. 7, 1998 to Barrett et al.) or to provide a connection to the resistive layer may be constructed to form the variably conductive layer 32. For example the pattern shown in this patent can be formed in the variably conductive layer 32 according to the present invention. Moreover, the variably conductive layer 32 may be continuously varying in the touch area so as to also improve the linearity of the device response. Alternatively, variation in both the edge area and the touch area may be employed to improve the linearity of the touch screen response and to reduce the width of the edge area.

Figure 6:
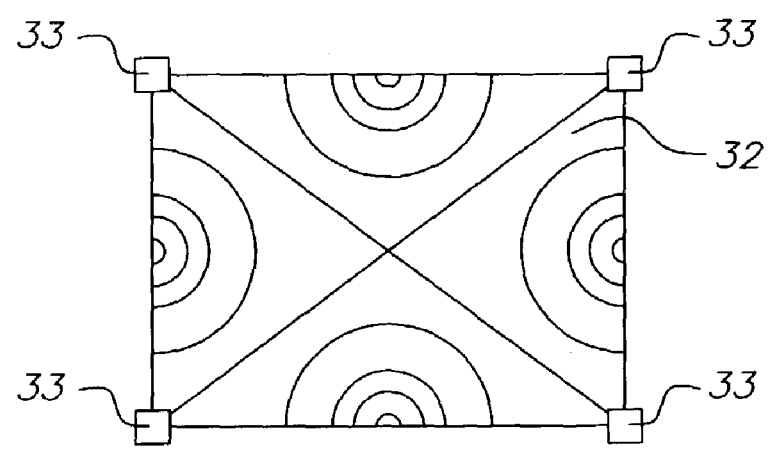
FIG. 6 is a topographical representation of a variable conductive layer having continuous variation in the touch area according to the one embodiment of the present invention.

FIG. 6 shows a topographical representation of variable conductivity in the touch area 35 to improve the linearity of response for a five-wire device having electrical connections 33 at each corner of the variably conductive layer 32.

Figure 7:
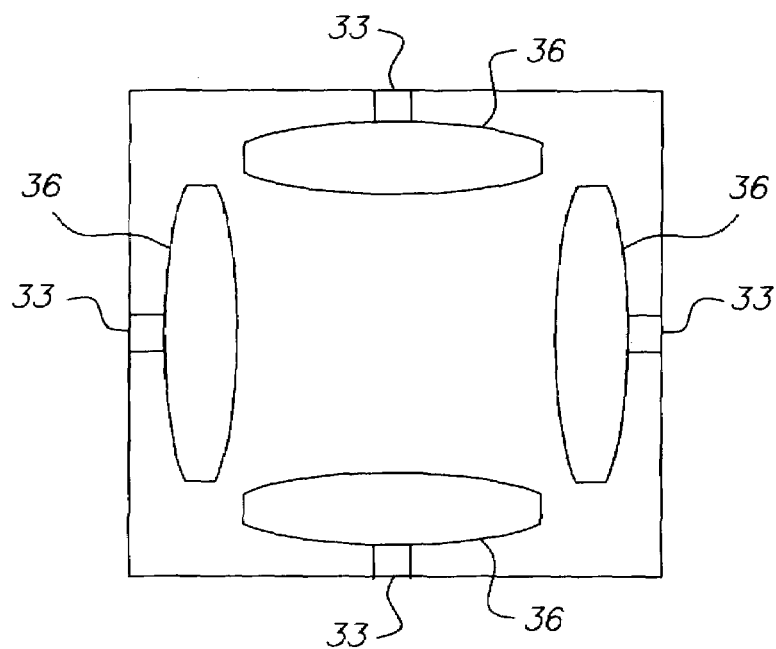
FIG. 7 is a schematic diagram of a variable conductive layer having width variation in the edge area according to the one embodiment of the present invention.

FIG. 7 shows a top view of variable conductivity in the highly conductive edge area 36 having variable width to improve the linearity of response for a five-wire device having electrical connections 33 at the center of each edge area.

Figure 8:
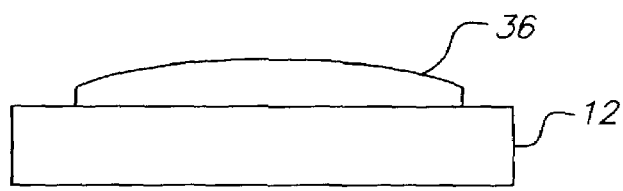
FIG. 8 is a schematic diagram of a variable conductive layer having thickness variation in the edge area according to the one embodiment of the present invention.

FIG. 8 shows a cross sectional view of a variably conductive edge area 36 shaped to improve the linearity of response wherein varying thickness to provide the variable conductivity.

A variably conductive layer 32 may be formed on the substrate 12 or the flexible transparent cover sheet 16 by a variety of means. U.S. Pat. No. 6,214,520 issued Apr. 10, 2001 to Wolk et al. describes the use of a thermal transfer element for forming a multi-layer device. Alternatively, inkjet devices can be configured to deposit liquid materials such as polythiophene in varying amounts and thickness to provide a variably conducting layer. Applicant has demonstrated the pixel-wise deposition of conductive materials using an inkjet device. Moreover, both approaches can be used to deposit varying types of materials, providing a multi-component layer with different materials as necessary to provide the preferred conductivity. These techniques are also readily used to provide discontinuous deposits as well as deposits that vary continuously over a surface.

Figure 4:
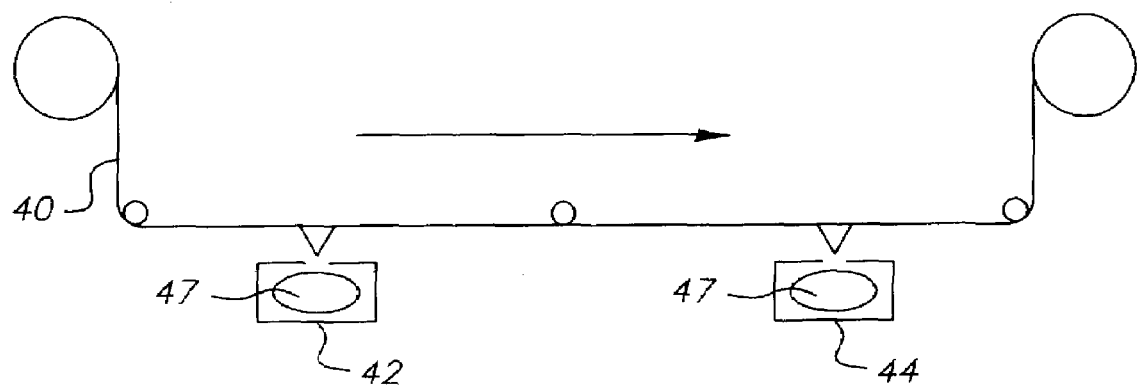
FIG. 4 is a schematic diagram illustrating a side view of process for manufacturing a touch screen according to the present invention.
Figure 5:
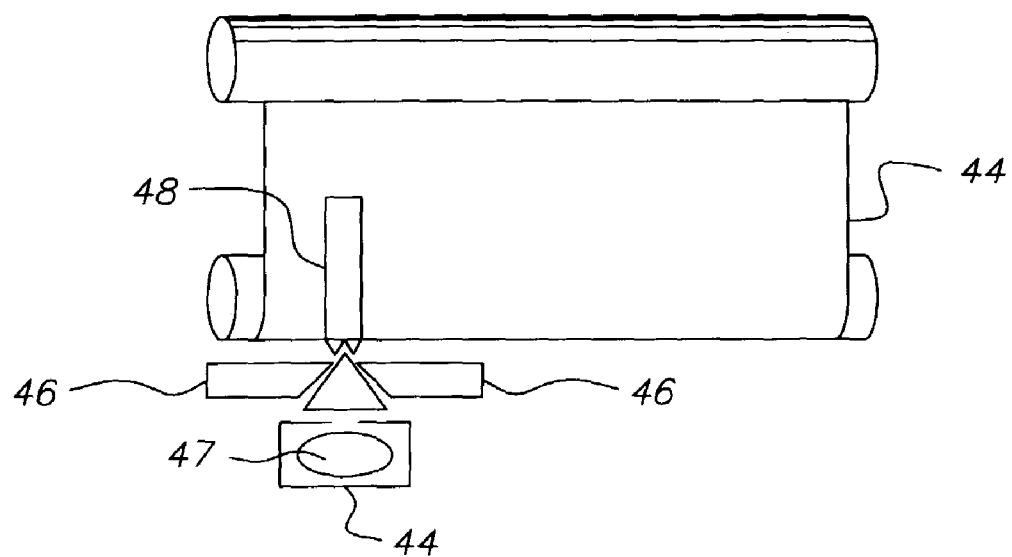
FIG. 5 is an end view of the manufacturing process.

Another useful technique may be sputtering. Techniques known in the art may be applied to continuous roll manufacturing processes to provide a variably conducting layer by passing a continuous substrate beneath a sputtering station with the necessary masking and aperture control devices. Referring to FIG. 4, a side view of a continuous substrate 40 passing above material deposition stations 42 and 44. The deposition stations 42 and 44 heat material 47 that is evaporated and condensed on the surface of the continuous substrate 40. By controlling the deposition of material, the time that a particular portion of the substrate is exposed to the material deposition can be controlled, for example with a shutter that opens and closes or a mask that restricts deposition to particular locations on the substrate. Referring to FIG. 5, an end view of the substrate 40 is shown with a deposition station 44 having a mask 46 to provide an area 48 of greater material deposition.

Another deposition method is liquid coating. By using a hopper containing liquid material, the material can be flowed in a controlled fashion onto a continuously moving substrate. By varying the thickness and location of the deposition, a variably conducting layer may be provided. Yet another technique of providing a variable conductive coating is the use of photo lithography by depositing a uniform layer of transparent conductive material and selectively removing the material to provide a variable conductive layer.

Once the variably conducting layer is provided on a substrate, the substrate may be combined with other elements to form a touch screen, as is known in the art.

Figure 9:
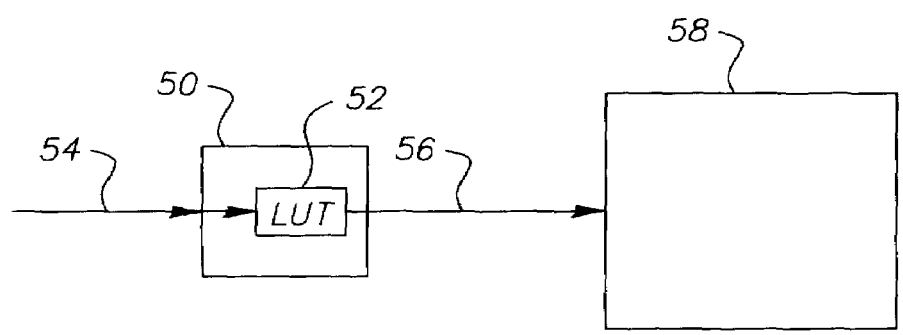
FIG. 9 is a schematic diagram showing a display and driver for adjusting an image signal to compensate for variations in transparency or color in the touch screen.

The transparency of the deposited material is a critical factor for any touch screen. The variably conductive layer may have a correspondingly varying thickness and transparency or color. For locations that are not part of the display area (for example the conductive patterns 30), this is of no consequence. For locations that are a part of the display area, the image signal employed to drive the display may be adjusted to accommodate any variation in transparency or color of the touch screen. By using a transparency or color map wherein each pixel in a display is adjusted in brightness or color to compensate for the transparency of the touch screen, a display with corrected brightness and color may be obtained. As shown in FIG. 9, the means for modifying the image signal 54 to provide a modified image signal 56 that compensates for variations in color or transparency of the touch screen can be provided in a display controller 50 having a lookup table 52 that provides a brightness and/or color adjustment for each pixel element of a display with a touch screen 58.

The present invention may be used in conjunction with any flat panel display, including but not limited to OLED and liquid crystal display devices. Moreover, a substrate or cover of an OLED display may be used as the substrate for a resistive touch screen.

The invention has been described in detail with particular reference to certain preferred embodiments thereof, but it will be understood that variations and modifications can be effected within the spirit and scope of the invention. For example, some of the advantages of the present invention may be obtained by combining a variable conductive layer with the conventional silver ink conductors in the edge areas, to reduce the amount of silver ink required and reduce the width of the edge area.

PARTS LIST 10 resistive-wire touch screen
12 substrate
14 first conductive layer
16 cover sheet
18 second conductive layer
20 spacer dots
30 conductive patterns
31 electrical connections
32 variably conducting layer
33 electrical connections
34 conductive layer
35 touch area
36 highly conductive portions
40 continuous substrate
42 deposition station
44 deposition station
46 mask
47 material
48 area of greater material deposition
50 display controller
52 look up table
54 image signal
56 modified image signal
58 display

What is claimed is:

1. A resistive touch screen, comprising:
   a) a transparent substrate defining a touch area;
   b) a first layer of conductive material formed on the transparent substrate and extending over the touch area;
   c) an electrical connection to the first layer of conductive material;
   d) a transparent flexible cover sheet;
   e) a second layer of conductive material formed on the transparent flexible cover sheet, the cover sheet being mounted in a spaced apart relationship from the substrate, whereby a touch in the touch area results in an a electrical contact between the first and second layers of conductive material at the point of touch;
   f) an electrical connection to the second layer of conductive material; and
   g) at least one of the first or second layers of conductive material having a variable conductivity.

2. The resistive touch screen claimed in claim 1, wherein the at least one layer of conductive material defines a region of uniform conductivity covering the touch area and an edge area having a higher conductivity than the uniform conductivity, the electrical connection to the at least one layer being made to the edge area.

3. The resistive touch screen claimed in claim 2, wherein the edge area has a variable conductivity effective to linearize electric fields in the touch area of the at least one layer of conductive material.

4. The resistive touch screen claimed in claim 2, wherein the edge area has a variable conductivity effective to compensate for the resistivity of the edge area.

5. The resistive touch screen claimed in claim 2, wherein the edge area has a variable conductivity provided by a pattern of variable width or thickness.

6. The resistive touch screen claimed in claim 1, wherein the at least one layer of conductive material has a variable conductivity in the touch area effective to linearize electric fields in the layer of conductive material in the touch area.

7. The resistive touch screen claimed in claim 1, wherein the substrate is rigid or flexible.

8. The resistive touch screen claimed in claim 1, wherein both the first and second conductive layers have a variable conductivity.

9. The resistive touch screen claimed in claim 8, wherein the layer having variable conductivity comprises polythiophene.

10. The resistive touch screen claimed in claim 1, wherein the layer having variable conductivity comprises ITO.

11. The resistive touch screen claimed in claim 1, wherein the layer having variable conductivity comprises a conductive polymer.

12. The resistive touch screen claimed in claim 1, wherein the conductivity of the layer having variable conductivity is determined by the thickness of the layer.

13. The resistive touch screen claimed in claim 1, wherein the conductivity of the layer having variable conductivity is determined by a variable composition of the layer.

14. The resistive touch screen claimed in claim 1, wherein the substrate is a substrate or cover of a flat-panel display.

15. The resistive touch screen claimed in claim 14, wherein the flat-panel display device is an OLED display.

16. The resistive touch screen claimed in claim 1, wherein the touch screen is four wire touch screen and wherein both the first and second layers of conductive material have a variable conductivity.

17. The resistive touch screen claimed in claim 1, wherein the touch screen is a five wire touch screen.

18. A resistive touch screen, comprising:
   a) a transparent substrate defining a touch area;
   b) a first layer of conductive material formed on the transparent substrate and extending over the touch area;
   c) an electrical connection to the first layer of conductive material;
   d) a transparent flexible cover sheet:
   a second layer of conductive material formed on the transparent flexible cover sheet, the cover sheet being mounted in a spaced apart relationship from the substrate, whereby a touch in the touch area results in an a electrical contact between the first and second layers of conductive material at the point of touch;
   f) an electrical connection to the second layer of conductive material; and
   g) at least one of the first or second layers of conductive material having a variable conductivity;

wherein the at least one layer of conductive material has a variable conductivity in the touch area effective to linearize electric fields in the layer of conductive material in the touch area and the layer of variable conductivity material has variable transparency and/or color in the touch area; and further comprising means for driving a display associated with the touch screen to compensate for the variable transparency and/or color of the touch screen.

19. A method of making a resistive touch screen, comprising the steps of:
   a) providing a transparent substrate defining a touch area;
   b) forming a first layer of conductive material on the substrate extending over the touch area;
   c) forming an electrical connection to the first layer of conductive material;
   d) providing a flexible transparent cover sheet;
   e) forming a second layer of conductive material on the flexible cover sheet;
   f) forming an electrical connection to the second layer of conductive material;
   g) mounting the flexible cover sheet in spaced apart relationship with respect to the substrate, such that a touch in the touch area will result in an electrical contact between the first and second layers at the point of touch; and
   h) wherein at least one of the first or second layers of conductive material has a variable conductivity.

20. The method claimed in claim 19, wherein the at least one layer of conductive material defines a region of uniform conductivity covering the touch area and an edge area having a higher conductivity than the uniform conductivity, the electrical connection to the at least one layer being made to the edge area.

21. The method claimed in claim 20, wherein the edge area has a variable conductivity effective to linearize electric fields in the touch area of the at least one layer of conductive material.

22. The method claimed in claim 19, wherein the at least one layer of conductive material has a variable conductivity in the touch area effective to linearize electric fields in the layer of conductive material in the touch area.

23. The method claimed in claim 19, wherein both the first and second conductive layers have a variable conductivity.

24. The method claimed in claim 19, wherein the layer having variable conductivity comprises ITO.

25. The method claimed in claim 19, wherein the layer having variable conductivity comprises a conductive polymer.

26. The method claimed in claim 25, wherein the layer having variable conductivity comprises polythiophene.

27. The method claimed in claim 19, wherein the conductivity of the layer having variable conductivity is determined by the thickness of the layer.

28. The method claimed in claim 19, wherein the conductivity of the layer having variable conductivity is determined by the composition of the layer.

29. The method claimed in claim 19, wherein the substrate is a substrate or cover of a flat-panel display.

30. The method claimed in claim 29, wherein the flat-panel display device is an OLED display.

31. The method claimed in claim 19, wherein the substrate or cover is provided in the form of a web of transparent flexible material and the variable conducting layer is deposited on the web using a roll-to-roll continuous process and individual substrates or covers are singulated from the web after deposition of the variable conducting layer.

32. The method claimed in claim 19, wherein the variably conducting layer is deposited using a thermal transfer process.

33. The method claimed in claim 19, wherein the variably conducting layer is formed by depositing a conductive pattern using an inkjet process.

34. The method claimed in claim 19, wherein the variably conducting layer is formed by depositing a conductive pattern using a sputtering process.

35. The method claimed in claim 19, wherein the variably conducting layer is formed by depositing a conductive pattern using a coating process.

* * * * *